United States Patent Office 3,409,507
Patented Nov. 5, 1968

3,409,507
METHOD FOR THE PRODUCTION OF 5'-INOSINIC ACID AND INOSINE
Masahiko Yoneda, Suita, Seiji Igarashi, Ashiya, Akira Imada, Nishinomiya, Ikuo Nogami, Kyoto, and Einosuke Omura, Nishinomiya, Japan, assignors to Takeda Chemical Industries, Ltd., Osaka, Japan
No Drawing. Filed Dec. 22, 1965, Ser. No. 515,742
Claims priority, application Japan, Dec. 23, 1964, 39/72,966
6 Claims. (Cl. 195—28)

This invention relates to a method for the production of 5'-inosinic acid (herinafter referred to as 5'-IMP) and inosine. More particularly, this invention relates to the method for the production of a member selected from the group consisting of 5'-IMP, inosine and a mixture thereof, which comprises inoculating a mutant, which is induced from a micro-organism belonging to the genus Bacillus and which requires both (1) adenine and (2) guanine or xanthine for its own growth, into a culture medium containing adenine source, and guanine source or xanthine source, incubating said culture medium until the objective substance is accumulated therein, and recovering the objective substance thus accumulated from the culture medium.

It is known that 5'-IMP and inosine each occupy an important role as a precursor in the biosynthesis of purine nucleotides, and that 5'-IMP is capable of enhancing the flavor of foods.

According to the present invention, the incubation of certain mutants induced from microorgaisms belonging to the genus Bacillus brings about accumulation of 5'-IMP and/or inosine, in a remarkably large amount in the culture medium, and thus accumulated 5'-IMP and inosine are easily recoverable from the culture medium. The said mutants cannot grow on a minimal culture medium such as that mentioned below on which wild type microorganisms of the mutants can grow, but they can grow on a culture medium prepared by adding to said minimal culture medium both (1) adenine source and (2) guanine source or xanthine source, namely, the mutants are those requiring both (1) adenine and (2) guanine or xanthine for their growth.

Minimal culture medium:

| | |
|---|---|
| Glucose | grams__ 5.0 |
| NaCl | do____ 5.0 |
| KH$_2$PO$_4$ | do____ 1.5 |
| (NH$_4$)$_2$HPO$_4$ | do____ 2.5 |
| Sodium glutamate | do____ 6.5 |
| Biotin | milligrams__ 2 |
| Vitamin B$_1$ | do____ 4 |
| Magnesium sulfate | gram__ 0.1 |
| Distilled water | liter__ 1 |
| (pH 6.0) | |

The object of this inventon is to provide a method for preparing 5'-IMP and/or inosine, which can be efficiently put into practice on an industrial scale with good yield. This object is realized by inoculating a mutant requiring both (1) adenine and (2) guanine or xanthine, of microorganisms belonging to the genus Bacillus, such as *Bacillus subtilis* Cohn emend Prazmowski, *Bacillus megaterium* de Bary and *Bacillus pumilus* Gottheil in a culture medium containing both (1) adenine source and (2) guanine source or xanthine source, incubating said culture medium, and recovering so-accumulated 5'-IMP and/or inosine from the culture medium. (Hereinafter the mutant mentioned above is referred to as "adenine and guanine or xanthine double requiring mutant of this invention".)

Adenine and guanine or xanthine double requiring mutant of this invention is induced by applying a per se conventional method for mutation of microorganisms. More concretely stated, wild type microorganisms belonging to the genus Bacillus, for example, *Bacillus subtilis* Cohn emend Prazmowski, *Bacillus megaterium* de Bary and *Bacillus pumilus* Gottheil are treated with e.g. ultraviolet ray, X-ray, nitrogen mustard, nitrous acid, etc. Employment of a spontaneously induced adenine and guanine or xanthine double requiring mutant of a microorganism belonging to the genus Bacillus is also within the scope of this invention.

An adenine and guanine or xanthine double requiring mutant of this invention is capable of accumulating exclusively 5'-IMP as 5'-nucleotide and inosine as nucleoside in a large amount in its culture broth, although the above-mentioned wild type microorganisms belonging to the genus Bacillus accumulate a mixture of various kinds of 5'-nucleotides, e.g. 5'-adenylic acid, 5'-guanylic acid, 5'-uridylic acid, 5'-cytidylic acid, etc. and nucleosides, e.g. adenine, guanine, uridine, cytidine, etc. in a small amount of their culture broth. Further, the adenine and guanine or xanthine double requiring mutants of this invention are capable of accumulating a larger amount of 5'-IMP and/or inosine than adenine sole requiring mutants induced from various kinds of microorganisms.

For the purpose of the industrial production of 5'-IMP and/or inosine by incubating an adenine and guanine or xanthine double requiring mutant of this invention, it is in general preferable to use a liquid culture medium. Generally the incubation is carried out either stationarily or in the manner of submerged process under aeration and/or agitation, employing a culture medium which must contain both (1) adenine source and (2) guanine source or xanthine source. Desirably the medium also contains proper assimilable carbon source(s) and digestible nitrogen source(s).

As the adenine source, there are exemplified adenine itself, a compound which contains an adenine component in its molecule and is easily convertible into adenine, or a natural substance containing the said compound. For example, use can be made of adenine, adenosine, 3'-adenylic acid, succinoadenylic acid, meat extract, cornsteep liquor, yeast extract, etc.

The guanine source can be guanine itself, a compound which contains a guanine component in its molecule and is easily convertible into guanine, or a natural substance containing the said compound. For example, use can be made of guanine, guanosine, 3'(5')-guanylic acid, meat extract, cornsteep liquor, yeast extract, etc.

As the xanthine source, there can be employed, for example, xanthine, xanthosine, 3'(5')-xanthylic acid, etc. A natural substance containing adenine source as well as guanine source, e.g. meat extract, yeast extract, etc. can be employed both as adenine and guanine source.

As the assimilable carbon source, one or more of starch, dextrin, sucrose, lactose, maltose, glucose, glycerol, etc. can be used; and various organic compounds or organic materials such as organic ammonium salts, organic nitrates, urea, etc. can be used not only as carbon source but also as digestible nitrogen source in the same way as the use of inorganic nitrogen sources, for example, inorganic ammonium salts such as ammonium sulfate, ammonium carbonate, ammonium phosphate, or various kinds of nitrates such as sodium nitrate, potassium nitrate, etc. Further, a small quantity of inorganic salts such as sodium chloride, phosphates, salts of metals such as calcium, zinc, manganese or iron can be added to the medium. If desired, other conventional nutrient factors such as vitamins are also added.

Adenine and guanine or xanthine source should be added to the culture medium in a sufficient amount for the growth of adenine and guanine or xanthine double requiring mutant of this invention. Generally, adenine source is added to the culture in a concentration of from about 10 milligrams per liter to 300 milligrams per liter, calculated in terms of adenine. Guanine source or xanthine source is preferably added to the culture medium in a concentration of from 10 milligrams per liter to 300 milligrams per liter, calculated in terms of guanine or xanthine.

Incubation conditions such as pH of the medium, incubation temperature are controlled so as to have objective substance(s) accumulated in maximum amount. Generally, the initial pH of the culture medium and the incubation temperature are preferably adjusted to 6.0–8.0 and 20 to 40° C., preferably 28 to 37° C., respectively.

Under the above-mentioned culture conditions the objective substance(s) is produced and accumulated in the culture medium with the lapse of time.

Incubation is continued until the maximum amount of the objective substance(s) is accumulated in the culture medium. Though the period required for the maximum accumulation of 5′-IMP and/or inosine is changeable depending on various factors, generally accumulation of the objective substance(s) in the culture medium reaches maximum usually between the 2nd day to 10th day from the starting of the incubation.

In the method of this invention, one or both of 5′-IMP and inosine are accumulated in a large amount, no other 5′-nucleotide or nucleoside being appreciably accumulated in the culture medium. Therefore, 5′-IMP and/or inosine are recovered individually or in admixture by simple procedures, e.g. those employing activated charcoal or anion exchange resin.

Following examples serve merely as illustrative of presently preferred embodiments of this invention and are not intended to restrict the scope of this invention.

In the present specification as well as in the following examples, the abbreviations mg., g., ml. and ° C. refer to milligram(s), gram(s), milliliter(s) and degrees centigrade, respectively; ratio and percentages are volume/volume, unless otherwise described.

Example 1

Mutant 405–113–B6 (ATCC No. 19163) is induced from *Bacillus subtilis* Cohn emend Prazmowski 405 by irradiation of ultraviolet ray (10 watt) for 5 minutes from 50 cm. height, followed by carrying out the penicillin screening method (Experientia 66, 41(1960) and the replica plating method (Journal of Bacteriology 63, 399(1952).

So-obtained mutant 405–113–B6 (ATCC No. 19163) requires both (1) adenine and (2) guanine or xanthine for its growth. The mutant is inoculated on 500 ml. of the culture medium mentioned below, followed by incubation under shaking at 28° C. for 20 hours.

Culture medium:
```
Soluble starch _____grams__ 80
Sodium citrate _____do____ 10
(NH4)2HPO4 _____do____ 10
Potassium chloride _____do____ 1.5
Magnesium sulfate _____do____ 0.5
Yeast extract _____do____ 5
Adenine _____milligrams__ 35
Xanthine _____do____ 30
Distilled water _____liter__ 1
(pH 7.0)
```

Thus-obtained culture broth is inoculated on 50 liters of culture medium of the same composition as mentioned above and incubated under aeration and agitation at 28° C. for 96 hours. In the culture filtrate 4.3 milligrams per milliliter of 5′-IMP and 1.4 milligrams per milliliter of inosine are accumulated.

Isolation of 5′-IMP and inosine thus accumulated is carried as follows:

The culture filtrate is adjusted to pH 2.5 to give precipitates. After the precipitates are removed, the filtrate is passed through a column (20 cm. x 20 cm.) packed with activated charcoal. 5′-IMP and inosine are eluted completely with a mixture of methanol, ammonia and water (50:1:49). After being concentrated and adjusted to pH 8.0, the eluate is passed through a column (15 cm. x 100 cm.) packed with strongly basic anion exchange resin (formic acid type, such as Dowex 1 x 8, Dow Chemical Co., U.S.A.), whereby 5′-IMP and a portion of the inosine is adsorbed on the said exchange resin and the rest of the inosine is left in the effluent.

Inosine adsorbed on the exchange resin is eluted with 0.005 M-formic acid solution. The eluate is mixed with the effluent followed by concentration. To the resultant solution, ethanol is added to a final concentration of 80% whereby precipitates are thrown down. The precipitates are recrystallized from a hot 80% aqueous ethanol solution to give 52 g. of crude crystals of inosine. 5′-IMP is eluted from above-mentioned column by passing therethrough first 180 liters of 0.1 N-formic acid solution, followed by 180 liters of a mixture of 0.1 N-sodium formate solution and 0.2 N-formic acid solution (1:1). The thus-obtained fraction of 5′-IMP is allowed to pass through a column (10 cm. x 100 cm.) packed with activated charcoal, then 5′-IMP is eluted with 40 liters of a mixture of 0.1 N-sodium hydroxide solution and methanol (10:90). After being concentrated, there is added to the eluate hot (about 60° C.) methanol to a concentration of 80%. The resultant solution is cooled to 5° C. to give 172 g. of crude crystals of disodium 5′-inosinate.

Example 2

Mutant 405–113–B17 (ATCC No. 19162) is induced from *Bacillus subtilis* Cohn emend Prazmowski 405 by irradiation of X-ray (50,000 roentgen), followed by penicillin screening (described above) and replica plating (described above).

So-obtained mutant 405–113–B17 requires both (1) adenine and (2) guanine or xanthine for its growth. The mutant is inoculated on 500 ml. of the culture medium mentioned below, followed by incubation under shaking at 28° C. for 22 hours.

Culture medium:
```
Glucose _____grams__ 50
K2HPO4 _____do____ 3
KH2PO4 _____do____ 1
Magnesium sulfate _____do____ 0.5
Corn steep liquor _____do____ 10
Soybean flour _____do____ 25
Distilled water _____liters__ 1
(pH 6.5)
```

The resultant culture broth is inoculated on 50 liters of the culture medium of the same composition as mentioned above, and incubated under aeration and agitation at 28° C. for 96 hours. In the culture filtrate, 2.3 milligrams per milliliter of 5′-IMP and 5.6 milligrams per milliliter of inosine are accumulated. The culture filtrate is treated after the manner described in Example 1 to obtain 92 g. of crude crystals of disodium 5′-inosinate and 211 g. of crude crystals of inosine.

Example 3

Mutant 310 m–151–B7 (ATCC No. 19160) is induced from *Bacillus megaterium* de Bary 310m by irradiation of ultraviolet ray (10 watt) for 3 minutes from 50 cm. height, followed by penicillin screening (described above) and replica plating (described above).

So-obtained mutant 310 m–151–B7 (ATCC No. 19160) requires both (1) adenine and (2) guanine or xanthine for its growth. The mutant is inoculated on 500 ml. of the culture medium mentioned below, followed by incubation under shaking at 30° C. for 20 hours.

Culture medium:
| | |
|---|---|
| Glucose | grams 50 |
| $K_2HPO_4$ | do 0.5 |
| $(NH_4)_2HPO_4$ | do 20 |
| Calcium chloride | do 0.4 |
| Magnesium sulfate | do 0.5 |
| Monosodium glutamate | do 10 |
| Meat extract | do 10 |
| Adenosine | milligrams 30 |
| Guanosine | do 20 |
| Distilled water | liters 1 |
| (pH 6.5) | |

The resultant culture broth is inoculated on 50 liters of the culture medium of the same composition as described above, and incubated under aeration and agitation at 30° C. for 72 hours. In the culture filtrate there are found 3.6 milligrams per milliliter of 5'-IMP accumulated, but no inosine substantially accumulated.

Then the culture filtrate is adjusted to pH 2.5. After removing the resulting precipitates, the filtrate is allowed to pass through a column (20 cm. x 100 cm.) packed with activated charcoal. 5'-IMP is eluted with a mixture of methanol, ammonia and water (50:1:49). After being concentrated and adjusted to pH 8.0, the effluent is allowed to pass through a column (15 cm. x 100 cm.) packed with strongly basic anion exchange resin (formic acid type, such as Dowex 1 x 8, Dow Chemical Co., U.S.A.). After the column is washed with water, 5'-IMP is eluted from the column by passing first therethrough 200 liters of 0.1 N-formic acid solution, followed by 180 liters of a mixture of 0.1 N-sodium formate solution and 0.02 N-formic acid solution (1:1). Thus-obtained fraction of 5'-IMP is passed through a column (10 cm. x 100 cm.) packed with activated charcoal, and then objective substance is eluted with a mixture of 0.1 N-sodium hydroxide, methanol and water (1:50:1). After concentration of the eluate, hot (about 60° C.) methanol is added thereto to a concentration of 80%. The resultant solution is cooled to 50° C. to give 194 g. of crude crystals of disodium 5'-inosinate.

Example 4

Mutant 310 m–151–B9 (ATCC No. 19161) is induced from *Bacillus megaterium* de Bary 310m by irradiation of ultraviolet ray (10 watt) for 5 minutes from 50 cm. height, followed by penicillin screening (described above) and replica plating (described above).

So-obtained mutant 310 m–151–B9 requires both (1) adenine and (2) guanine or xanthine for its growth. The mutant is inoculated on 50 liters of culture medium of the same composition as employed in Example 1 and then incubated under aeration and agitation at 30° C. for 96 hours. In the culture filtrate there are found 4.2 milligrams per milliliter of 5'-IMP, but no inosine substantially accumulated.

The culture filtrate is treated after the manner described in Example 3 to obtain 166 g. of crude crystals of disodium 5'-inosinate.

Example 5

Adenine and guanine double requiring mutant 208–152–B1 (ATCC No. 19164) is induced from *Bacillus pumilus* Gottheil 208 by irradiation of X-ray (50,000 roentgen), followed by penicillin screening (described above) and replica plating (described above).

The mutant is inoculated on 50 liters of a culture medium of the same composition as employed in Example 3, and then incubated under aeration and agitation at 30° C. for 72 hours. In the culture filtrate 2.7 milligrams per milliliter of 5'-IMP and 5.4 milligrams per milliliter of inosine are accumulated. The culture filtrate is treated after the manner described in Example 1 to obtain 105 g. of crude crystals of disodium 5'-inosate and 207 g. of crystals of inosine.

Having thus disclosed invention, what is claimed is:

1. A method for producing a member selected from the group consisting of 5'-inosinic acid, inosine and a mixture thereof, which comprises inoculating a mutant, which is induced from a microorganism belonging to the genus Bacillus and which requires both (1) adenine and (2) guanine or xanthine into a culture medium containing adenine source and a member selected from the group consisting of guanine source and xanthine source, incubating said culture medium until objective substance is accumulated therein, and recovering the objective substance thus accumulated from the culture medium.

2. A method according to claim 1, wherein the microorganism is selected from the group consisting of *Bacillus subtilis* Cohn emend Prazmowski, *Bacillus megaterium* de Bary and *Bacillus pumilus* Gottheil.

3. A method according to claim 1, wherein the mutant is incubated in a culture medium containing adenine source, a member selected from the group consisting of guanine source and xanthine source, assimilable carbon source, digestible nitrogen source and other nutrients necessary for the growth of the mutant at a temperature of about 20° C. to about 40° C. under aerobic conditions.

4. A method according to claim 3, wherein the mutant is induced from *Bacillus subtilis* Cohn emend Prazmowski.

5. A method according to claim 3, wherein the mutant is induced from *Bacillus magaterium* de Bary.

6. A method according to claim 3, wherein the mutant is induced from *Bacilus pumilus* Gottheil.

References Cited

UNITED STATES PATENTS 3,118,820   1/1964   Uchida et al. _____ 195—28

ALVIN E. TANENHOLTZ, *Primary Examiner.*